United States Patent [19]

Koike et al.

[11] 3,786,281

[45] Jan. 15, 1974

[54] SCANNING PULSE GENERATOR

[75] Inventors: Norio Koike, Kokubunji; Mikio Ashikawa, Koganei, both of Japan

[73] Assignee: Hitachi, Ltd., Tokyo, Japan

[22] Filed: Dec. 20, 1972

[21] Appl. No.: 316,814

[30] Foreign Application Priority Data

Dec. 22, 1971 Japan............................46/103695

[52] U.S. Cl.......... 307/269, 307/221 C, 307/223 C, 328/37, 328/105

[51] Int. Cl.......................... H03k 5/00, H03k 5/156

[58] Field of Search...................... 328/37, 105, 106, 328/62; 307/221, 223, 225, 244, 269

[56] References Cited

UNITED STATES PATENTS 3,290,606 12/1966 Rodner.......................... 307/269 X

*Primary Examiner*—John Zazworsky

*Attorney*—Paul M. Craig, Jr. et al.

[57] ABSTRACT

A scanning pulse generator comprising shift register means for producing pulses with a time delay and a circuit for dividing each of the delayed pulses into a plurality of pulses.

6 Claims, 8 Drawing Figures

SCANNING PULSE GENERATOR

BACKGROUND OF THE INVENTION

1. Field of the Invention

The present invention relates to scanning pulse generators for sequential scanning as in solid-state camera devices.

2. Description of the Prior Art

In camera devices, a number of photosensitive elements are arranged in row or in matrix and they are activated when sequentially scanned. Meanwhile, in memory devices, a number of memory elements are sequentially scanned for sequential storage of information in selected memory elements or for sequential read-out of information from the memory elements.

Heretofore, for the purpose of sequentially scanning a number of elements, a circuit for generating scanning pulses has been known of a shift register type, i.e., of such a type that by making use of two or more trains of clock pulses of different phases, respective inputted pulses are delayed by a predetermined time from the next preceding inputted pulses for successively delivering output pulses. Such a generating circuit comprises a cascade connection of unit circuits each including two mutually coupled inverter circuits, each inverter circuit including two or three transistor elements, e.g., field-effect transistors, wherein the respective unit circuits sequentially produces output pulses each delayed by a predetermined period of time from the corresponding input pulses. The outputs of the generating circuit are applied to respectively corresponding photosensitive or memory elements. Such a construction was defective in that since each unit circuit for generating one scanning pulse must include 4–6 transistor elements, miniaturization of the total circuit construction was impossible. Therefore, this fact was particularly a bar to improvement of the resolution of solid-state camera devices.

More particularly, for example, in order to attain 500 television lines which is a lower limit of the resolution of currently used camera tube, using a semiconductor substrate having a length of 1 cm, a spacing of not more than 20 $\mu$m is required between respective adjacent photosensitive elements each of which constitutes one picture element. Since each photosensitive element must be associated with different one unit circuit in the scanning pulse generating circuit, the above-mentioned condition means that the length of each unit circuit on its one side where it is to be connected with its associated photosensitive element is not more than 20 $\mu$m. Meanwhile, each conventional unit circuit included 4–6 transistor elements as mentioned above, so that the length of each unit circuit on said one side could not be 50$\mu$m nor smaller without difficulty. Thus, the conventional solid-state camera devices were not able to provide such a resolution as was comparable with that of ordinary camera tubes.

SUMMARY OF THE INVENTION

The primary object of the present invention is to provide a sequentially scanning pulse generator remarkably miniaturized and free from the above-mentioned drawbacks.

Another object of the present invention is to provide a pulse generating circuit arrangement effective to greatly improve the resolution of a solid-state camera device in which the circuit arrangement is used.

In accordance with the present invention, for attaining the above-mentioned objects, there is provided means of a simplified structure for dividing the output pulse of each unit circuit into a plurality of pulses thereby enabling each one unit circuit to achieve functions of more than one unit circuit. As a result, the spacing between output terminals of a resulting sequential scanning pulse generator are greatly reduced so that the spacings between controlled elements with which said output terminals are connected is reduced accordingly. This leads to a great increase of resolution of a camera device using the pulse generator.

DESCRIPTION OF THE PREFERRED EMBODIMENTS

Figure 1:
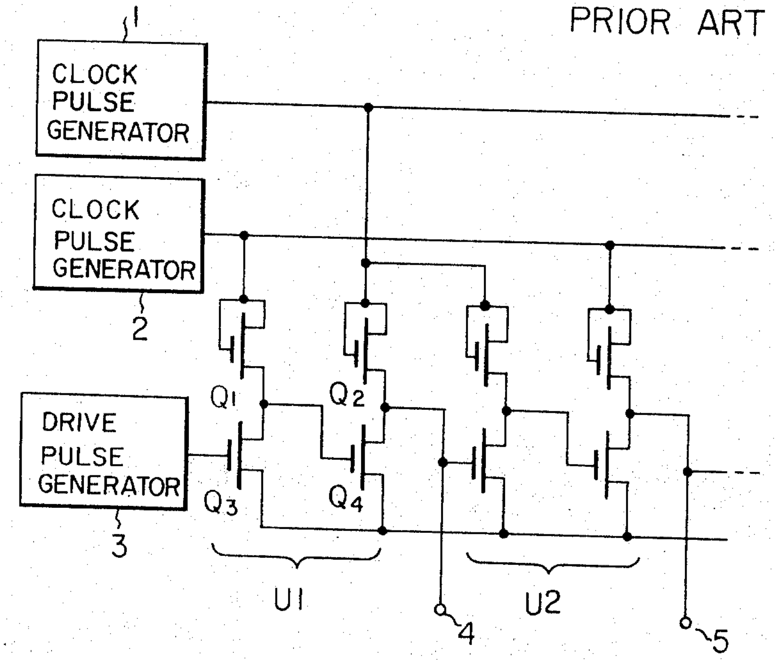
FIG. 1 PRIOR ART
FIG. 1 is a circuit diagram showing an example of a conventional scanning pulse generator.

For better understanding of the present invention, reference is again made to a conventional circuit now in conjunction with FIG. 1 illustrating a shift register type circuit for generating scanning pulses.

In the drawing of FIG. 1, blocks 1 and 2 designate circuits for generating trains of clock pulses of different phases and block 3 designates a drive pulse generating circuit. Numerals 4 and 5 are output terminals. Insulated gate field-effect transistors $Q_1$ and $Q_2$ have their gates short-circuited to their own drains to serve as load resistors of insulated gate field-effect transistors $Q_3$ and $Q_4$ respectively. The transistors $Q_3$ and $Q_4$ serve to activate their associated controlled elements, for example, photosensitive elements not shown. The source of the transistors $Q_1$ and $Q_2$ are connected with the drains of the transistors $Q_3$ and $Q_4$ respectively. The junction of the source of the transistor $Q_1$ and the drain of the transistor $Q_3$ is connected with the gate of the transistor $Q_4$ in the next stage. Apparently, each stage or each of series connection of two transistors operates as an inverter, and four transistors $Q_1$ – $Q_4$ constitute one unit circuit. The connection point between gate and drain of transistor $Q_1$ is connected with the clock pulse generator 2 while the connection point between the gate and drain of the transistor $Q_2$ is connected with the clock pulse generator 1.

In operation, pulses from the drive pulse generator 3 are applied to the gate of the transistor $Q_3$. The drive pulses are sequentially shifted under control of two trains of clock pulses fed from the clock pulse generators 1 and 2 to the succeeding stages, so that respective unit circuits U1, U2, . . . . sequentially deliver outputs at a predetermined time interval. That is, first, an output is produced at the output terminal 4 of the unit circuit U1 with a predetermined time delay, next, another output is produced at the output terminal 5 of the unit circuit U2 with the identical time delay from the output of the unit circuit U1 and so forth. These sequentially delayed outputs from the unit circuits are fed to their associated controlled elements such as photosensitive elements (not shown as mentioned above) for selective activation of the elements.

Though in the above example one unit circuit consists of four insulated gate field-effect transistors, in another example of conventional circuit a number of unit circuits are connected in cascade, each consisting of six insulated gate field-effect transistors. It should be taken for granted that the insulated gate field-effect transistor may be substituted by junction type field-effect transistors, bucket brigade devices (BBD) or usual bipolar transistors for obtaining similar effects. The same is true of the following embodiments.

As has been explained above, in the conventional pulse generating circuit, each unit circuit includes 4 – 6 transistor elements, which makes it impossible to miniaturize the circuit and lowers the resolution of a camera device in which the pulse generating circuit is employed.

Figure 2:
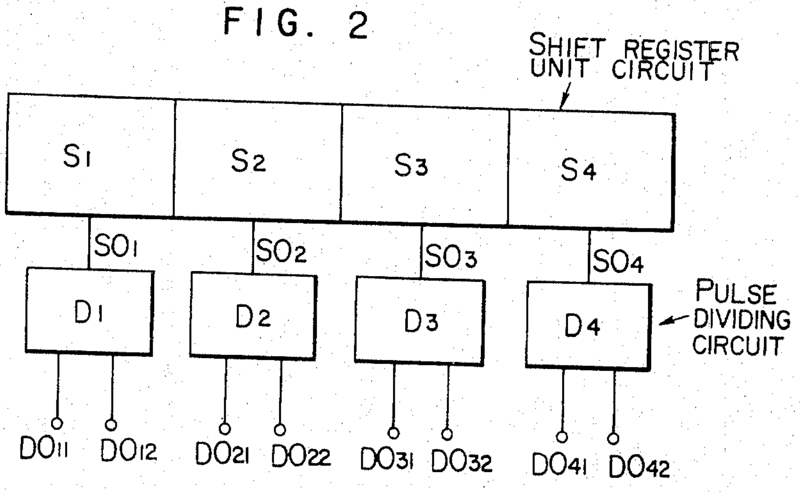
FIG. 2 is a diagram showing a fundamental construction of a scanning pulse generator in accordance with the present invention.

Referring now to FIG. 2 illustrating a fundamental construction of a scanning pulse generating circuit according to the present invention, $S_1$, $S_2$, $S_3$ and $S_4$ indicate unit circuits made of shift registers and are similar in construction to those of FIG. 1. $D_1$, $D_2$, $D_3$ and $D_4$ indicate pulse dividing circuits, which are connected through output conductors of unit circuits $SO_1$, $SO_2$, $SO_3$ and $SO_4$ with the unit circuits $S_1$, $S_2$, $S_3$ and $S_4$ respectively. The pulse dividing circuits $D_1$, $D_2$, $D_3$ and $D_4$ have output conductors $DO_{11}$ and $DO_{12}$, $DO_{21}$ and $DO_{22}$, $DO_{31}$ and $DO_{32}$, and $DO_{41}$ and $DO_{42}$ respectively which may be electrically coupled with controlled elements such as photosensitive elements or memory elements. Thus, an output pulse of each of the unit circuits $S_1$ – $S_4$ is divided into two output pulses by the corresponding one of the pulse dividing circuits $D_1$ – $D_4$ and the so divided pulses are fed to the elements (not shown) through conductors $DO_{11}$, $DO_{12}$, . . . , $DO_{42}$.

Though in FIG. 2 each of the output pulses of the unit circuits is divided into two, the circuit may be modified so that each said pulse is divided into three or more. The point is that the output of each unit circuit is divided into two or more by pulse dividing circuit means, thereby feeding the so divided pulses to the controlled elements. As a result, one unit circuit furnishes more than one output pulse and therefore is considered to be equivalent with more than one unit circuit. In this connection, it is prerequisite that each of the pulse dividing circuits must be simpler in construction that the unit circuit and must have a length on its one side, where it is connected with a corresponding controlled photosensitive or controlled element on a semiconductor substrate, smaller than the length of its corresponding unit circuit. The present invention can satisfy this prerequisite since, as will be shown and explained hereinafter, each pulse dividing circuit can be constituted by two transistor elements or less.

It should be noted that though in FIG. 2 embodiment the number of unit circuits and that of pulse dividing circuits are 4, respectively, a larger number of the circuits may be employed without limiting thereto as have been usually employed.

Figure 3:
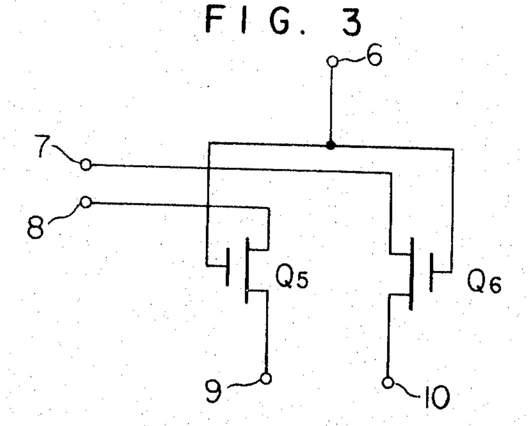
FIG. 3 is a circuit diagram of the major part of the scanning pulse generator embodying the present invention.

FIG. 3 shows an example of a construction of a pulse dividing circuit in accordance with the present invention, in which the output of one unit circuit is divided into two output pulses. In the drawing of FIG. 3, $Q_5$ and $Q_6$ indicate insulated gate field-effect transistors while reference numeral 6, an input terminal for receiving a pulse, for example a pulse fed from one of the conductors $SO_1$, $SO_2$, . . . of FIG. 2, numerals 7 and 8, clock terminals to which trains of clock pulses 180° out of phase with respect to each other are applied, and numerals 9 and 10, output terminals. For convenience of explanation, it is assumed that the transistors $Q_5$ and $Q_6$ have a P-channel and the negative logic is employed, so that if N-channel transistors are used, mere reversal of polarities of signals to be fed thereto makes the following explanation equally applicable.

Figure 4:
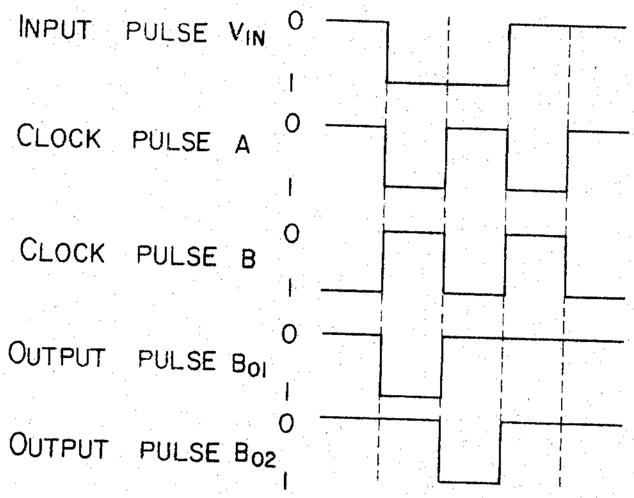
FIG. 4 is a time chart of waveforms of signals on various points of the circuit of FIG. 3.

In operation, an output of a unit circuit such as an output pulse from unit circuit $S_1$, $S_2$, $S_3$ or $S_4$ through conductor $SO_1$, $SO_2$, $SO_3$ or $SO_4$ (FIG. 2) is fed to the input terminal 6 connected in common with the gates of transistors $Q_5$ and $Q_6$ while clock pulses such as from clock pulse generators 1 and 2 (FIG. 1) are fed to the terminals 7 and 8 and hence to the drains of the transistors $Q_5$ and $Q_6$. Here, reference is also made to FIG. 4. The above-mentioned pulse to the input terminal 6 is assumed as $V_{IN}$, and the trains of clock pulses to terminals 7 and 8 are assumed as A and B respectively. As can be seen from the illustration in FIG. 4, the clock pulse trains A and B are 180° out of phase with respect to each other and have a pulse width equal to one-half of that of the input pulse $V_{IN}$ fed to the terminal 6 from a shift register unit circuit, rising and falling of the input pulse $V_{IN}$ being concurrent with either rising or falling of clock pulse train A or B. While the input level assumes logical value "1", the transistors $Q_5$ and $Q_6$ are conductive (in ON state), so that "1" and "0" states of the clock pulse trains A and B directly appear on the output terminals 9 and 10 respectively. Here, only "1" state is contributory to the scanning and "0" state is not. While the clock pulse signal A is in "1" state, the clock pulse signal B is in "0" state, thus a scanning pulse being generated only on the output terminal 9. While the clock pulse signal A is in "0" state after a time interval of the pulse width of the clock pulse, the clock pulse signal B is in "1" state, thus a scanning pulse being generated only on the output terminal 10 after the above-mentioned time interval. consequently, the pulse dividing circuit, each time it receives one input pulse $V_{IN}$, generates on the terminal 9 and 10 sequential pulses $B_{01}$ and $B_{02}$ having a pulse width of one-half of that of the input pulse $V_{IN}$ with a time delay of one-half of the pulse width of the input pulse $V_{IN}$ between the generated pulses. It is therefore well understood that by connecting such a pulse dividing circuit as shown in FIG. 3 to each of such shift register unit circuit as shown in FIG. 3 through conductors $SO_1$, $SO_2$ . . . , each shift register unit circuit is now capable of producing output pulses twice as much as the input pulses at a rate twice higher than when it is not provided with the pulse dividing circuit. Further, as can be seen from FIG. 3, since the construction of the pulse dividing circuit is so simple as to require only one transistor element for producing one scanning output pulse with a result that one photosensitive or memory controlled element is provided for each transistor element, the degree of integration of the resulting sequential scanning pulse generator can be much increased. Actually, according to the inventors' experimental layout, the length of one output of the pulse dividing circuit was 20 $\mu$m which was identical with that of one insulated gate field-effect transistor. This length is less than one-half of the length (50 $\mu$m) of the conventional shift register unit circuit which length has been heretofore required for each one photosensitive or memory controlled element. This means that the miniaturization of the sequential scanning pulse generator lessens the limited spacing in arranging photosensitive elements of one-half or less smaller than heretofore with a result that the resolution of a solid-state camera device using the present generator is improved.

Figure 5:
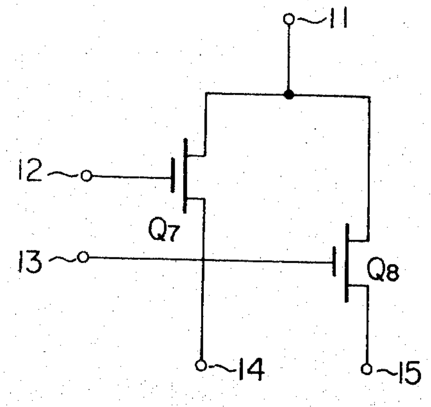
FIGS. 5 — 7 are circuit diagrams of the major parts of scanning pulse generators embodying the present invention.

Referring next to FIG. 5 showing another embodiment, which is different from FIG. 3 embodiment in the manner of feeding input pulse $V_{IN}$ and clock pulses A and B to transistors constituting the pulse dividing circuit, an input pulse $V_{IN}$ from a shift register unit circuit is supplied through an input terminal 11 to the drains connected in common therewith of insulated gate field-effect transistors $Q_7$ and $Q_8$ while clock pulse trains A and B are supplied through clock terminals 12 and 13 to the gates of the transistors $Q_7$ and $Q_8$. Accordingly, the input pulse $V_{IN}$ causes sequential scanning pulses to appear on output terminals 14 and 15 depending upon the clock pulse trains A and P applied to the terminals 12 and 13. The sources of the transistors $Q_7$ and $Q_8$ are connected with the output terminals 14 and 15 respectively. In this connection, when the voltage of the clock pulse trains A and B is sufficiently higher than that of the input pulse $V_{IN}$ so that the transistors $Q_7$ and $Q_8$ are operated in nonsaturated state, the input voltage is allowed to appear in the form of two divided outputs suffering from little attenuation. The two divided output pulses may have such a pulse width and mutual time-base relation as mentioned in connection with FIG. 3 embodiment and illustrated in FIG. 4. In other words, there is a time delay between the two divided pulses corresponding to the pulse width of the divided pulses which is one-half of the pulse width of the input pulse.

In the above-described embodiments, one input pulse is converted into two divided pulses, but it may be converted into three of more divided pulses based on the same principle.

Figures 6, 7:
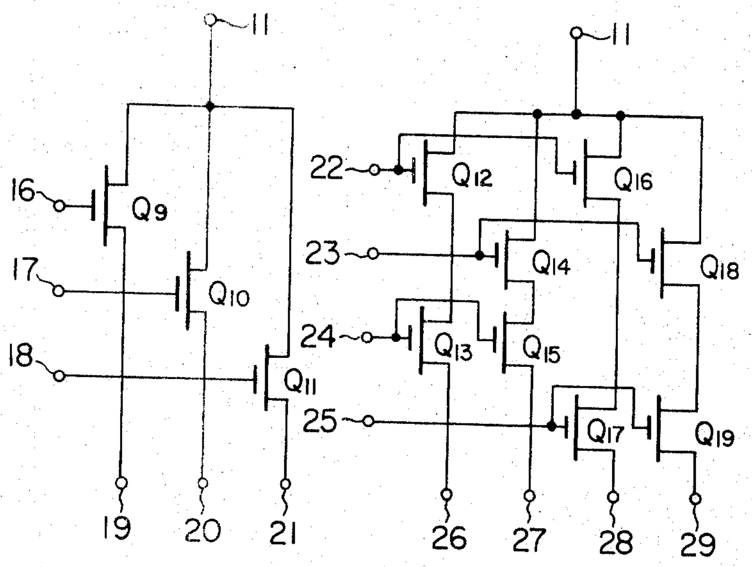
Figure 8:
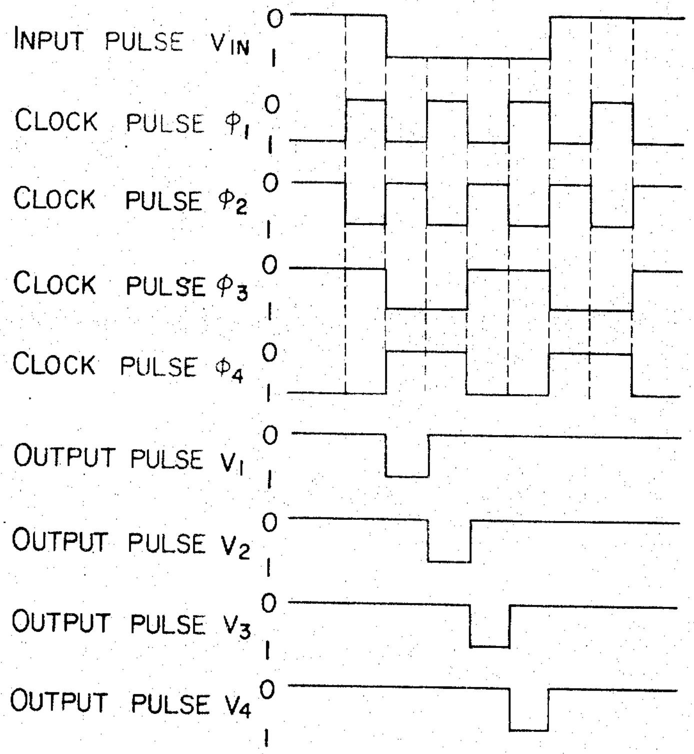
FIG. 8 is a time chart of waveforms of signals on various points of the circuit of FIG. 7.

In FIG. 6 embodiment, three insulated gate field-effect transistors are employed in a circuit connection similar to that of FIG. 5. That is, the drains of the transistors $Q_9$, $Q_{10}$ and $Q_{11}$ are connected in common with the input terminal 11 while their gates are connected to clock terminal 16, 17 and 18 respectively. A train of clock pulses is applied to each of the three clock terminals 16, 17 and 18, while an input pulse is applied to the input terminal 11. The three trains of clock pulses have a phase difference of 120° from one another and a pulse width equal to one-third of that of the input pulse. Thus, with the input pulse applied to the terminal 11, the three transistors are requentially made conductive for a predetermined period of time by the three trains of clock pulses applied to the terminals 16 – 18, thereby dividing the input pulse into three sequentially scanning pulses appearing on output terminals 19, 20 and 21 with which the sources of the transistors $Q_9$, $Q_{10}$ and $Q_{11}$ are connected respectively. In FIG. 7 embodiment, eight insulated gate field-effect transistors $Q_{12}$ – $Q_{19}$ are employed. Transistors $Q_{12}$ and $Q_{13}$, $Q_{14}$ and $Q_{15}$, $Q_{16}$ and $Q_{17}$, $Q_{18}$ and $Q_{19}$ are respectively connected in series. The drains of the transistors $Q_{12}$, $Q_{14}$, $Q_{16}$ and $Q_{18}$ are connected in common with the terminal 11. The gates of the transistors $Q_{12}$ and $Q_{16}$, $Q_{14}$ and $Q_{18}$, $Q_{13}$ and $Q_{15}$, and $Q_{17}$ and $Q_{19}$ are connected with each other. Here, four trains of clock pulses $\phi_1$, $\phi_2$, $\phi_3$ and $\phi_4$ are shown in FIG. 8 are applied to clock terminals 22, 23, 24 and 25 which are connected with the gates of the transistors $Q_{12}$, $Q_{14}$, $Q_{13}$ and $Q_{17}$ respectively. The pulse widths of the pulse trains $\phi_1$ and $\phi_2$ are the same while their polarities are opposite to each other. Similarly, the pulse widths of the pulse trains $\phi_3$ and $\phi_4$ are the same and identical with twice the pulse width of the pulse trains of $\phi_1$ and $\phi_2$ while their polarities are opposite to each other. As a result, the transistors $Q_{12}$ – $Q_{19}$ are selectively made conductive and four divided pulses $V_1$, $V_2$, $V_3$ and $V_4$ appear on terminals 26, 27, 28 and 29, respectively in such a timed relation as illustrated in FIG. 8.

Although in FIG. 7 embodiment two transistor elements are required for each output pulse, this embodiment still offers an advantage of increasing the degree of integration since conventionally four transistor elements have been required for each output pulse as mentioned in connection with FIG. 1.

Further, it should be also understood that a plurality of pulse dividing circuits may be connected in "tree" form to achieve the objects of the present invention.

Additional advantage of the present invention is that the rate of sequential scanning pulses obtained from the pulse generator is made n-times higher than that of an input pulse because the input pulse is divided into *n* pulses ($n = 2, 3, \ldots$ ). This means that the present invention attains a higher speed operation.

We claim:

1. In a sequential scanning pulse generator comprising a pulse source for providing drive pulses, a shift register means including a plurality of unit circuits connected in cascade, each of said drive pulses being fed to the first stage of said cascade connection of the unit circuits and delayed for a predetermined time thereby and means for deriving the delayed pulses from said unit circuits, the improvement comprising a circuit provided for each of said unit circuits to divide a delayed pulse therefrom into a plurality of sequential pulses and means for deriving the divided sequential pulses from the pulse dividing circuit.

2. The sequential scanning pulse generator according to claim 1, in which said each pulse dividing circuit comprises input means for receiving a delayed pulse from its associated unit circuit of said shift register means, a plurality of transistor elements with which said input means is connected coupled and output means provides for each of said transistor elements, and means for generating trains of clock pulses isconnected with each of said transistors elements, said trains of clock pulses being of different phases and applied to said different transistor elements in synchronism with said delayed pulses from said input means, the arrangement being such that said transistor elements are made operative not simultaneously but in conformity with the different phase of said trains of clock pulses.

3. The sequential scanning pulse generator according to claim 2, in which said transistor elements are insulated gate field-effect transistors.

4. The sequential scanning pulse generator according to claim 3, in which each said pulse dividing circuit has the drain of each of said transistors supplied with a different one of said trains of clock pulses, the gates of all of said transistors connected in common with said input means, and the sources of said transistors connected with their corresponding output means.

5. The sequential scanning pulse generator according to claim 3, in which each said pulse dividing circuit has the drains of all of said transistors connected in common with said input means, the gate of each of said transistors supplied with a different one of said trains of clock pulses, and the sources of said transistors connected with their corresponding output means.

6. The sequential scanning pulse generator according to claim 3, in which each of said pulse dividing circuit includes: an input terminal connected with its associated unit circuit of said shift register means; first, second, third and fourth clock terminals; first and fifth transistors having their gate connected in common with said first clock terminal and their drains connected in common with said input terminal; third and seventh transistors having their gates connected in common with said second clock terminal and their drains connected in common with said input terminals; second and fourth transistors having their gates connected in common with said third clock terminal, the drains of said second and fourth transistors being connected with the sources of said first and third transistors respectively; sixth and eighth transistors having their gates connected in common with said fourth clock terminal, the drains of said sixth and eighth transistors being connected with the sources of said fifth and seventh transistors respectively; and first, second, third and fourth output terminals connected with the sources of said second, fourth, sixth and eighth transistors respectively; and in which said clock pulse train generating circuit supplies said first and second clock terminals with first and second trains of clock pulses of the same pulse width of opposite polarities with each other and supplies said third and fourth clock terminals with third and fourth trains of clock pulses having the same pulse width identical with twice the pulse width of said first and second pulse trains and opposite polarities with each other.

* * * * *